(12) United States Patent
Li

(10) Patent No.: US 11,214,674 B2
(45) Date of Patent: Jan. 4, 2022

(54) HIGH-WHITENESS MGO SUBSTRATE, PREPARATION METHOD THEREOF AND DECORATIVE BOARD HAVING THE SUBSTRATE

(71) Applicant: JIANGSU LANGYUE NEW MATERIALS TECHNOLOGY CO., LTD., Jiangsu (CN)

(72) Inventor: Guoping Li, Jiangsu (CN)

(73) Assignee: JIANGSU LANGYUE NEW MATERIALS TECHNOLOGY CO., LTD., Jiangsu (CN)

(*) Notice: Subject to any disclaimer, the term of this patent is extended or adjusted under 35 U.S.C. 154(b) by 0 days.

(21) Appl. No.: 17/004,019

(22) Filed: Aug. 27, 2020

(65) Prior Publication Data

US 2021/0292535 A1 Sep. 23, 2021

Related U.S. Application Data

(63) Continuation of application No. PCT/CN2020/080145, filed on Mar. 19, 2020.

(51) Int. Cl.

| | | |
|---|---|---|
| *C08L 29/04* | (2006.01) | |
| *C09K 21/02* | (2006.01) | |
| *C08J 5/18* | (2006.01) | |
| *C08J 5/12* | (2006.01) | |
| *B29C 70/78* | (2006.01) | |
| *B29C 70/02* | (2006.01) | |
| *B28B 3/00* | (2006.01) | |
| *B28B 1/00* | (2006.01) | |
| *B28B 17/02* | (2006.01) | |
| *B28B 17/00* | (2006.01) | |
| *B32B 18/00* | (2006.01) | |
| *B32B 7/12* | (2006.01) | |
| *C08L 97/02* | (2006.01) | |
| *B29K 629/00* | (2006.01) | |
| *B29K 709/02* | (2006.01) | |
| *B29K 709/08* | (2006.01) | |
| *B29K 711/14* | (2006.01) | |
| *B29K 627/06* | (2006.01) | |

(52) U.S. Cl.
CPC ............. *C08L 29/04* (2013.01); *B28B 1/008* (2013.01); *B28B 3/00* (2013.01); *B28B 17/0009* (2013.01); *B28B 17/026* (2013.01); *B29C 70/021* (2013.01); *B29C 70/028* (2013.01); *B29C 70/78* (2013.01); *B32B 7/12* (2013.01); *B32B 18/00* (2013.01); *C08J 5/124* (2013.01); *C08J 5/18* (2013.01); *C08L 97/02* (2013.01); *C09K 21/02* (2013.01); *B29K 2627/06* (2013.01); *B29K 2629/04* (2013.01); *B29K 2709/02* (2013.01); *B29K 2709/08* (2013.01); *B29K 2711/14* (2013.01); *B29K 2715/006* (2013.01); *C08J 2329/04* (2013.01); *C08J 2397/02* (2013.01); *C08J 2429/04* (2013.01); *C08J 2497/02* (2013.01); *C08L 2201/02* (2013.01)

(58) Field of Classification Search
CPC ......................... C08K 2003/222; C04B 35/04
See application file for complete search history.

(56) References Cited

U.S. PATENT DOCUMENTS

| | | | | |
|---|---|---|---|---|
| 5,395,571 | A | * 3/1995 | Symons | .................. C04B 28/00 264/42 |
| 2004/0126602 | A1* | 7/2004 | Wallner | ................ E04F 13/141 428/500 |
| 2014/0250827 | A1 | 9/2014 | Gillman | |
| 2021/0187925 | A1* | 6/2021 | Hill | ........................ B32B 29/005 |
| 2021/0292236 | A1* | 9/2021 | Li | ........................... C04B 16/06 |
| 2021/0292494 | A1* | 9/2021 | Li | ........................... C08K 7/06 |

FOREIGN PATENT DOCUMENTS

| | | |
|---|---|---|
| CN | 1211502 | 3/1999 |
| CN | 101871246 | 10/2010 |
| CN | 102964109 | 3/2013 |
| CN | 103979920 | 8/2014 |
| CN | 104196195 | 12/2014 |
| CN | 104891948 | 9/2015 |
| CN | 105130374 | 12/2015 |
| CN | 109437825 | 3/2019 |
| CN | 110219428 | 9/2019 |
| CN | 110746174 | 2/2020 |

OTHER PUBLICATIONS

"International Search Report (Form PCT/ISA/210) of PCT/CN2020/080145," dated Nov. 27, 2020, pp. 1-5.

\* cited by examiner

*Primary Examiner* — Liam J Heincer

(74) *Attorney, Agent, or Firm* — JCIP Global Inc.

(57) ABSTRACT

The application discloses a high-whiteness MGO substrate, a preparation method thereof and a decorative board having the substrate. The high-whiteness MGO substrate includes a surface layer and a substrate, wherein the substrate is prepared from a forming agent, a lightweight filler, a modifier and water in parts by mass as follows: 40-49 parts of light burned magnesium oxide powder, 18-25 parts of magnesium sulfate heptahydrate, 16-25 parts of a polyvinyl alcohol solution, 16-20 parts of a plant powder, and 0.5-2 parts of a modifier; the modifier being obtained by mixing citric acid, phosphoric acid, and sodium sulfate in a mass ratio of 10:3:6.

9 Claims, No Drawings

US 11,214,674 B2

HIGH-WHITENESS MGO SUBSTRATE, PREPARATION METHOD THEREOF AND DECORATIVE BOARD HAVING THE SUBSTRATE

CROSS-REFERENCE TO RELATED APPLICATION

This application is a continuation of international PCT application serial no. PCT/CN2020/080145 filed on Mar. 19, 2020. The entirety of the above-mentioned patent application is incorporated herein by reference and made a part of this specification.

BACKGROUND OF THE INVENTION

1. Technical Field

The present application relates to the field of decorative materials, in particular to a high-whiteness MGO substrate, a preparation method thereof and a decorative board having the substrate.

2. Background of Related Art

A magnesium oxide fireproof board is also called an MGO board, a magnesium oxide board, a magnesite board or a magnesium board. Components for preparing the magnesium oxide fireproof board include active high-purity magnesium oxide (MgO), high-quality magnesium chloride ($MgCl_2$), alkali-resistant glassfiber fabrics, plant fiber, incombustible lightweight perlite, chemically stable lithopone, high-molecular polymers and high-performance modifiers, and the magnesium oxide fireproof board is manufactured through mechanical rolling and mainly used for indoor non-bearing walls and suspended ceilings and substrates of various decorative boards.

At present, Chinese Patent Granted Publication No. CN101871246B discloses an MGO board, which is prepared from a forming agent, a reinforcing material, a lightweight filler, a modifier and water, wherein the forming agent is magnesium oxide, magnesium sulfate and magnesium chloride, the reinforcing material is glassfiber mesh fabric or other reinforcing materials, and the modifier includes a whitening agent, a stabilizer and a toner.

In the prior art, a glassfiber mesh fabric is used as the reinforcing material, and due to the excellent toughness of glassfiber mesh fabric, the internal bonding strength is low when glassfiber mesh fabric is combined with other materials; and when the MGO board is slotted from the outside during mounting, peeling may easily occur at the slotted position of the MGO board subjected to a shearing force and cause cracking at the opening of the slot, thus influencing the practicability of the MGO board.

SUMMARY OF THE INVENTION

In order to overcome the defects in the prior art, the present application provides a high-whiteness MGO substrate, which is advantageous by having high internal bonding strength and being not prone to peeling and cracking.

In a first aspect, the application provides the following technical solution:

a high-whiteness MGO substrate, including a surface layer and a substrate, wherein the substrate is prepared from the following components in parts by mass: 40-49 parts of light burned magnesium oxide powder, 18-25 parts of magnesium sulfate heptahydrate, 16-25 parts of a polyvinyl alcohol solution, 16-20 parts of a plant powder, and 0.5-2 parts of a modifier. In one embodiment, the modifier includes citric acid, phosphoric acid, and sodium sulfate in a mass ratio of 10:3:6.

By adopting the above technical solution, light-burned magnesium oxide and magnesium sulfate heptahydrate are used as a forming agent which is a basic raw material for preparing the substrate; the polyvinyl alcohol solution is used as a binder and has a good film-forming property so as to wrap the light burned magnesium oxide and the plant powder, so that bubbles on the surface and in the internal structure are both reduced, the internal bonding strength of the substrate is effectively enhanced, and the substrate is not prone to peeling and cracking; and the modifier with such mass ratio is dissolvable in water and has good stability and corrosion resistance, thereby prolonging the service life of the substrate.

Further, the light burned magnesium oxide has a content of magnesium oxide of ≥85% and a content of reactive magnesium oxide of >65%.

By adopting the above technical solution, the rate of preparation is increased, and the use amount of light burned magnesium oxide is saved, so that the production cost is reduced.

Further, the plant powder has a fineness of 20-120 mesh, and includes one or more selected from the group consisting of poplar wood powder, white wood powder, bamboo powder, straw powder and rice hull powder.

By adopting the above technical solution, the selected plant powder with such fineness can disperse well during preparation of the substrate, and can be easily and uniformly mixed with other components in the substrate, so that the internal bonding strength of the substrate is effectively enhanced, and the substrate is not prone to peeling and cracking when being slotted; and poplar wood powder, white wood powder, bamboo powder, straw powder and rice hull powder are used as the lightweight filler, so that the weight of the entire substrate is reduced, and the cost for preparing the substrate is reduced.

In a second aspect, the present application provides a preparation method of the high-whiteness MGO substrate, which is advantageous by being simple in preparation, effectively improving the internal bonding strength of the substrate and allowing the substrate to be not prone to peeling and cracking;

In particular, the application provides the following technical solution:

a preparation method of the high-whiteness MGO substrate includes the following steps of:

S1, weighing light burned magnesium oxide powder, magnesium sulfate heptahydrate, a polyvinyl alcohol solution with a mass concentration of 20%-40%, a plant powder and a modifier according to a formula;

S2, mixing the plant powder with a bleaching agent in an amount sufficient for immersing the plant powder, soaking the plant powder for 2-10 min, stirring the obtained mixture for 30-40 min, and filtering; and subjecting the plant powder obtained by filtering to constant-temperature steam treatment for 5-8 min under a temperature of 120-130° C. to obtain a bleached plant powder;

S3, uniformly mixing and stirring magnesium sulfate heptahydrate and the polyvinyl alcohol solution with the mass concentration of 20%-40% which are weighed in the step S1, sequentially adding light burned magnesium oxide and the modifier and performing stirring, then adding the bleached plant powder prepared in the step S2, and uniformly stirring the obtained mixture to obtain a magnesium oxysulfate cement;

S4, spreading the magnesium oxysulfate cement prepared in the step S3 into a mold, performing flat-pressing for 3-10 min under a temperature of 100-220° C. and a pressure of 5-20 MPa, leaving the mold with the magnesium oxysulfate cement to stand for 5-6 h, and removing the mold to obtain a molded semi-finished product; and S5, curing the molded semi-finished product obtained in the step S4 for 5-7 days under a temperature of 20-30° C. and a humidity of 40-60% to obtain a semi-finished substrate; taking out the semi-finished substrate for trimming, cutting and polishing; and then drying the polished semi-finished substrate under a temperature of 50-95° C. for 20-30 min to obtain a shaped substrate.

By adopting the above technical solution, the sequence of adding various raw materials is strictly controlled, so that uniform dispersion of light burned magnesium oxide, magnesium sulfate heptahydrate, the modifier, granulated lignocellulose and xylem fiber can be ensured, and the internal binding force of the substrate is improved; and by adopting the preparation method, bubbles in the magnesium oxysulfate cement are further reduced, so that the internal bonding strength of the substrate is effectively improved, and the substrate is not prone to peeling and cracking.

Further, the bleaching agent includes a hydrogen peroxide bleaching agent and a diaminostilbene disulfonic acid derivative in a mass ratio of 2:3.

By adopting the above technical solution, the formulation of the bleaching agent increases the whiteness of the substrate, and effectively improves the color durability and yellowing resistance of the substrate.

In a third aspect, the present application provides a high-whiteness MGO decorative board, which is advantageous by being simple in preparation, having an effectively improved internal bonding strength and being not prone to peeling and cracking;

In particular, the application provides the following technical solution: a high-whiteness MGO decorative board includes a surface layer and a substrate, wherein the substrate adopts the high-whiteness MGO substrate provided in the first aspect, and the surface layer is any one selected from the group consisting of marble, wood veneer and a PVC surface layer.

By adopting the above technical solution, when the surface layer is made from marble, the utilization of marble resources is increased; meanwhile, marble is prepared into the composite board, so that the problems of low construction speed, frangibility and cracking, and high cost of marble are solved. When the surface layer is made from wood veneer, a composite wood floor board can be prepared, and by virtue of the glassfiber surface mat of the substrate, the influence of humidity on the composite wood floor board, which causes warping of the wood floor board, is greatly reduced. When the surface layer is a PVC surface layer, a composite fireproof board can be prepared, and the composite board has an ultra-high dimensional stability and is not prone to cracking. The composite board can be quickly mounted into wallboards, floors and ceilings after being slotted, and is applicable to cold and dry areas, providing a high fire rating.

Further, the PVC surface layer includes a face layer, a core layer and a bottom layer which are sequentially bonded through an adhesive; and both the face layer and the bottom layer are polyvinyl chloride (PVC) films; and the PCV surface layer is prepared as follows:

1) immersing the core layer in a resin for 120-150 min, and taking out the core layer to obtain an impregnated core layer;

2) uniformly applying the adhesive to two sides of the PVC films, and drying and curing the PVC films to obtain adhesive-coated PVC films; and 3) adhering the adhesive-coated PVC films obtained in the step 2) to two sides of the impregnated core layer obtained in the step 1), and performing hot-press molding under a temperature of 130-170° C. and a pressure of 10-21 MPa to obtain the PCV surface layer.

By adopting the above technical solution, the PVC surface layer is simple in preparation, and the strength of the PVC surface layer is equal in all directions, so that the property of the entire decorative board of being not prone to peeling and cracking is effectively improved.

Further, the core layer is aluminum oxide abrasion paper or a glassfiber surface mat.

By adopting the above technical solution, the aluminum oxide abrasion paper and the glassfiber surface mat both have excellent abrasion resistance and scratch resistance, and at the same time, the entire decorative board is endowed with the property of being not prone to peeling and cracking.

Further, the resin includes one or both of melamine resin and urea-formaldehyde resin.

By adopting the above technical solution, both melamine resin and urea-formaldehyde resin have high heat resistance and moisture resistance, and the moisture resistance of the entire decorative board is further improved.

In summary, the present application has the following beneficial effects:

firstly, as the modifier with such mass ratio is preferably used in the present application, bubbles in the substrate are further reduced, so that the internal bonding strength of the decorative board is effectively improved, and the decorative board is not prone to peeling and cracking during mounting; and secondly, the aluminum oxide abrasion paper and the glassfiber surface mat are preferably used as the material for preparing the PVC surface layer, so that the entire decorative board has excellent abrasion resistance and scratch resistance.

DETAILED DESCRIPTION OF THE INVENTION

The present application will now be described in further detail with reference to the embodiments.

Sources of raw materials: see Table 1 below.

TABLE 1

| Sources and Specifications of Raw Materials of High-whiteness MGO Decorative Board | | | |
|---|---|---|---|
| Raw material | Source | Composition and specification | Origin |
| Forming agent | Light burned magnesium oxide | Content of magnesium oxide 85%, content of reactive magnesium oxide 80%, fineness 200 mesh | Yingkou Xinyao Magnesium |

TABLE 1-continued

Sources and Specifications of Raw Materials of High-whiteness MGO Decorative Board

| Raw material | Source | Composition and specification | Origin |
|---|---|---|---|
| | Magnesium sulfate heptahydrate | Purity 99% | Weifang Dakang Chemical |
| Lightweight filler | Poplar wood powder | Fineness 20-120 mesh, moisture content 0.5-10%. | Wuxi Simude |
| | White wood powder | Fineness 20-120 mesh, moisture content 0.5-10%. | Wuxi Simude |
| | Bamboo powder | Fineness 20-120 mesh, moisture content 0.5-10%. | Wuxi Simude |
| | Straw powder | Fineness 20-120 mesh, moisture content 0.5-10%. | Wuxi Simude |
| | Rice hull powder | Fineness 20-120 mesh, moisture content 0.5-10%. | Wuxi Simude |
| Modifier | Citric acid monohydrate | Purity 99% | Shandong Ruisheng |
| | Sodium sulfate | Sodium sulphate purity 99% | Zibo Huayan |
| | Phosphoric acid | Industrial grade 85% | Nantong Shuangxian Fine |
| | Polyvinyl alcohol solution | Mass concentration 30% | Chaohu Desheng Chemical |
| Resin | Melamine resin | Purity 99.8% | Jining Hongming |
| | Urea-formaldehyde resin | Molecular weight 90.08 | Kedi Chemical |
| Bleaching agent | Hydrogen peroxide bleaching agent | Hydrogen peroxide, industrial grade, mass concentration ≥27.5% | Hebei Chenkun |
| | Diaminostilbene disulfonic acid derivative | 4,4'-diaminodiphenylamine-2-sulfonic acid, mass concentration ≥98.0% | Guangdong Wengjiang |
| | Alkali-free glassfiber surface mat | Gram weight per square 50 g/m$^2$ | Sinoma Science & Technology |
| | Polyurethane adhesive | CR361 | Jilin Zhengqi |
| | Aluminium oxide abrasion paper | 787*1092 mm | Shanghai Hongshu |
| | PVC film | Weight per square meter 30 g | Hangzhou Lin'an Clean |
| | Marble | 2600*2000*1600 | Shiyan Tianci |
| | Yellow poplar veneer | Thickness 0.6 mm | Guangzhou Huayuan |

A bleaching powder stirrer purchased from Zhengzhou Youzhuo Automation Equipment Co., Ltd was used as bleaching equipment;

a BY214*8/E series multi-ply plywood hot press purchased from Linyi Lanshan District Jianye Machinery Factory (Linyi Lanshan District Jianye Shunda Machinery Co., Ltd.) was used as the hot press; and a PG02 series CNC slotting machine (self-digging machine) was purchased from Shanghai Eternal Co., Ltd.

EXAMPLES

The components and formulations in various Examples are shown in Table 2.

TABLE 2

Components and Formulations of High-whiteness MGO Substrates in Various Examples:

| Component | | Example 1 | Example 2 | Example 3 | Example 4 | Example 5 | Example 6 |
|---|---|---|---|---|---|---|---|
| Forming agent | Light burned magnesium oxide | 40 kg | 45 kg | 49 kg | 45 kg | 45 kg | 45 kg |
| | Magnesium sulfate heptahydrate | 18 kg | 20.5 kg | 25 kg | 20.5 kg | 20.5 kg | 20.5 kg |
| | Polyvinyl alcohol solution | 16 kg | 20.5 kg | 25 kg | 20.5 kg | 20.5 kg | 20.5 kg |
| Light weight filler | Poplar wood powder | 16 kg (poplar wood powder) | 18 kg (poplar wood powder) | 20 kg (poplar wood powder) | 18 kg (poplar wood powder: white wood flour = 1:1) | 18 kg (poplar wood powder: white wood powder: | 18 kg (poplar wood powder) |
| | White wood powder | | | | | | |
| | Bamboo powder | | | | | | |

TABLE 2-continued

Components and Formulations of High-whiteness MGO Substrates in Various Examples:

| | | | | | | | |
|---|---|---|---|---|---|---|---|
| | Straw powder | | | | | | |
| | Rice hull powder | | | | | | bamboo powder: straw powder: rice hull powder = 1:1:1:1:1 |
| Modifier | Citric acid monohydrate Sodium sulfate Phosphoric acid | 0.5 kg (citric acid monohydrate: sodium sulfate: phosphoric acid = 10:3:6) | 1.25 kg (citric acid monohydrate: sodium sulfate: phosphoric acid = 10:3:6) | 2 kg (citric acid monohydrate: sodium sulfate: phosphoric acid = 10:3:6) | 1.25 kg (citric acid monohydrate: sodium sulfate: phosphoric acid = 10:3:6) | 1.25 kg (citric acid monohydrate: sodium sulfate: phosphoric acid = 10:3:6) | 1.25 kg (citric acid monohydrate: sodium sulfate: phosphoric acid = 10:3:6) |
| | Fineness of plant powder | 70 mesh | 70 mesh | 70 mesh | 70 mesh | 70 mesh | 20 mesh |
| Bleaching agent | Hydrogen peroxide bleaching agent 4,4'-diamino-diphenylamine-2-sulfonic acid | 50 kg (hydrogen peroxide bleaching agent: 4,4'-diamino-diphenylamine-2-sulfonic acid = 2:3) | 50 kg (hydrogen peroxide bleaching agent: 4,4'-diamino-diphenylamine-2-sulfonic acid = 2:3) | 50 kg (hydrogen peroxide bleaching agent: 4,4'-diamino-diphenylamine-2-sulfonic acid = 2:3) | 50 kg (hydrogen peroxide bleaching agent: 4,4'-diamino-diphenylamine-2-sulfonic acid = 2:3) | 50 kg (hydrogen peroxide bleaching agent: 4,4'-diamino-diphenylamine-2-sulfonic acid = 2:3) | 50 kg (hydrogen peroxide bleaching agent: 4,4'-diamino-diphenylamine-2-sulfonic acid = 2:3) |
| | Time, temperature and humidity of curing | 6 days, 25° C., 55% | 6 days, 25° C., 55% | 6 days, 25° C., 55% | 6 days, 25° C., 55% | 6 days, 25° C., 55% | 6 days, 25° C., 55% |

| | Component | Example 7 | Example 8 | Example 9 | Example 10 | Example 11 |
|---|---|---|---|---|---|---|
| Forming agent | Lightweight magnesium oxide | 45 kg | 45 kg | 45 kg | 45 kg | 45 kg |
| | Magnesium sulfate heptahydrate | 20.5 kg | 20.5 kg | 20.5 kg | 20.5 kg | 20.5 kg |
| | Polyvinyl alcohol solution | 20.5 kg | 20.5 kg | 20.5 kg | 20.5 kg | 20.5 kg |
| Light weight filler | Poplar wood powder | 18 kg (poplar wood powder) | 18 kg (poplar wood powder) | 18 kg (poplar wood powder) | 18 kg (poplar wood powder) | 18 kg (poplar wood powder) |
| | White wood powder | | | | | |
| | Bamboo powder | | | | | |
| | Straw powder | | | | | |
| | Rice hull powder | | | | | |
| Modifier | Citric acid monohydrate Sodium sulfate Phosphoric acid | 1.25 kg (citric acid monohydrate: sodium sulfate: phosphoric acid = 10:3:6) | 1.25 kg (citric acid monohydrate: sodium sulfate: phosphoric acid = 10:3:6) | 1.25 kg (citric acid monohydrate: sodium sulfate: phosphoric acid = 10:3:6) | 1.25 kg (citric acid monohydrate: sodium sulfate: phosphoric acid = 10:3:6) | 1.25 kg (citric acid monohydrate: sodium sulfate: phosphoric acid = 10:3:6) |
| | Fineness of plant powder | 120 mesh | 70 mesh | 70 mesh | 70 mesh | 70 mesh |
| Bleaching agent | Hydrogen peroxide bleaching agent 4,4'-diamino-diphenylamine-2-sulfonic acid | 50 kg (hydrogen peroxide bleaching agent: 4,4'-diamino-diphenylamine-2-sulfonic acid = 2:3) | 50 kg (hydrogen peroxide bleaching agent: 4,4'-diamino-diphenylamine-2-sulfonic acid = 2:3) | 50 kg (hydrogen peroxide bleaching agent: 4,4'-diamino-diphenylamine-2-sulfonic acid = 2:3) | 50 kg (hydrogen peroxide bleaching agent: 4,4'-diamino-diphenylamine-2-sulfonic acid = 1:1) | 50 kg (hydrogen peroxide bleaching agent: 4,4'-diamino-diphenylamine-2-sulfonic acid = 2:3) |
| | Time, temperature and humidity of curing | 5 days, 20° C., 55% | 5 days, 20° C., 40% | 7 days, 30° C., 70% | 6 days, 25° C., 55% | 6 days, 25° C., 55% |

Each of the high-whiteness MGO substrates of Examples 1-11 above was prepared as follows:

S1, a mold of 2440*1220*3 (mm) was selected and cleaned;

S2, light burned magnesium oxide powder, magnesium sulfate heptahydrate, a polyvinyl alcohol solution with a mass concentration of 30%, a plant powder and a modifier were weighed in parts by weight according to Table 2;

S2, the plant powder weighed according to Table 2 was placed into the bleaching powder stirrer, a bleaching agent obtained by mixing a hydrogen peroxide bleaching agent and 4,4'-diaminodiphenylamine-2-sulfonic acid in a mass ratio of 2:3 was added to immerse the plant powder, the plant powder was soaked for 6 min, and then the bleaching equipment was operated to perform a stirring bleaching procedure for 35 min; and then the plant powder was taken out and subjected to constant-temperature steam treatment for 8 min under a temperature of 125° C., and then taken out and dried to obtain a bleached plant powder;

S3, magnesium sulfate heptahydrate was added into the polyvinyl alcohol solution with the mass concentration of 30% for mixing and uniform stirred, then light burned magnesium oxide and the modifier were sequentially added and uniformly stirred to form a mixed slurry, and the bleached plant powder prepared in the step S2 was added into the mixed slurry and uniformly stirred to obtain a magnesium oxysulfate cement;

S4, the magnesium oxysulfate cement prepared in the step S3 was spread into a mold, the mold containing magnesium oxysulfate cement was put into a hot press under a temperature of 160° C. for flat-pressing, and after 6 h, the mold was removed to obtain a molded semi-finished product; and S5, the molded semi-finished product obtained in the step S4 was put into a curing room with a temperature, humidity and time according Table 2 and then taken out for trimming, cutting and polishing; and then the polished molded decorative board was dried under a temperature of 85° C. for 10 min to obtain a shaped substrate.

The properties of the high-whiteness MGO substrates prepared in the above Examples were tested by the following method.

Apparent properties: MGO substrate or composite board standard test blocks were subjected to microscopic detection with a scanning electron microscope and observed for surface cracking.

Determination of whiteness: one piece of 200 mm*200 mm was randomly cut from each of three boards in a set of samples, and then impurity, grease and the like affecting whiteness and color in the experimental samples were balanced under the condition of moisture absorption after conditioning (samples with a high moisture regain was pre-dried at 50° C. for 30 minutes for pre-conditioning). The samples were then placed in sample boxes, and lids of the sample boxes were screwed tightly. The three sample boxes were put into a colorimeter and measured in sequence, and chromaticity values were recorded.

Determination of static bending strength was carried out according to GB/T33544-2017 "Glass fiber and magnesium cement board".

Bending strength: tests were carried out according to JC688-2006 "Glass fiber & magnesium cement board".

Impact strength: tests were carried out referring to an impact strength determination method in GB/T1043.1 "Plastics—Determination of Charpy impact properties—Part 1: Non-instrumented impact test".

Dehalogenation resistance: referring to JC688-2006 "Glass fiber & magnesium cement board", one piece of 200 mm*200 mm was randomly cut from each of three boards in a set of samples, and was put into a constant temperature and humidity box with relative humidity of greater than or equal to 90% and a temperature of 30° C.-35° C., and after 24 hours, the samples were taken out and observed for the presence or absence of water drops or damping.

Determination of screw holding capability: referring to JC688-2006 "Glass fiber & magnesium cement board", one piece of 50 mm*50 mm was randomly cut from each of three boards in a set of samples, a hole with a diameter of 3.2 mm was drilled at the intersection of diagonal lines of each sample with a bench drill in advance, and then a wood screw was screwed vertically into a depth of 10 mm±1 mm protruding from the opposite side without hammering, then the wood screw was pulled out with a loading speed of 50 N/S, and a limit load value was recorded.

Determination after slotting: referring to JC688-2006 "Glass fiber & magnesium cement board", one piece of 300 mm*300 mm was randomly cut from each of three boards in a set of samples, side edges of diagonal corners of the samples were slotted with the CNC slotting machine, the slots were formed towards the inner depth of the samples at a speed of 50 N/S until peeling and cracking of the samples occurred, and the slotting depths at which peeling and cracking of the samples occurred were recorded.

Abrasion resistance test: evaluation was carried out according to GB/T18301-2012 "Refractory products-Determination of resistance to abrasion at ambient temperature".

Refractory performance test: evaluation was carried out according to JC688-2006 "Glass fiber & magnesium cement board" and GB/T8624-1997 "Classification of burning behavior of building materials and products".

TABLE 3

Test Results of High-whiteness MGO Substrates

| Detection item | Whiteness | Apparent morphology | Static bending strength | Bending strength | Impact strength | Dehalogenation | Screw holding capacity | Slotting depth |
|---|---|---|---|---|---|---|---|---|
| JC688-2006 minimum standard value | | No cracking | 10 Mpa | 12 Mpa | 2.5 kJ/m$^2$ | No water drops, no damping | 30 N/m | |
| Example 1 | 85% | No cracking | 30 Mpa | 34 Mpa | 23 kJ/m$^2$ | No water drops, no damping | 35 N/m | 162 mm |
| Example 2 | 85% | No cracking | 35 Mpa | 38 Mpa | 26 kJ/m$^2$ | No water drops, no damping | 37 N/m | 171 mm |
| Example 3 | 85% | No cracking | 33 Mpa | 35 Mpa | 24 kJ/m$^2$ | No water drops, no damping | 36 N/m | 166 mm |

TABLE 3-continued

Test Results of High-whiteness MGO Substrates

| Detection item | Whiteness | Apparent morphology | Static bending strength | Bending strength | Impact strength | Dehalogenation | Screw holding capacity | Slotting depth |
|---|---|---|---|---|---|---|---|---|
| Example 4 | 85% | No cracking | 34 Mpa | 32 Mpa | 22 kJ/m$^2$ | No water drops, no damping | 29 N/m | 163 mm |
| Example 5 | 86% | No cracking | 33 Mpa | 34 Mpa | 22 kJ/m$^2$ | No water drops, no damping | 35 N/m | 165 mm |
| Example 6 | 84% | No cracking | 31 Mpa | 32 Mpa | 22 kJ/m$^2$ | No water drops, no damping | 26 N/m | 162 mm |
| Example 7 | 90% | No cracking | 34 Mpa | 36 Mpa | 24 kJ/m$^2$ | No water drops, no damping | 35 N/m | 167 mm |
| Example 8 | 84% | No cracking | 32 Mpa | 33 Mpa | 23 kJ/m$^2$ | No water drops, no damping | 29 N/m | 164 mm |
| Example 9 | 87% | No cracking | 35 Mpa | 36 Mpa | 25 kJ/m$^2$ | No water drops, no damping | 35 N/m | 168 mm |
| Example 10 | 81% | No cracking | 32 Mpa | 33 Mpa | 23 kJ/m2 | No water drops, no damping | 32 N/m | 164 mm |
| Example 11 | 84% | No cracking | 34 Mpa | 34 Mpa | 24 kJ/m$^2$ | No water drops, no damping | 33 N/m | 165 mm |

The high-whiteness MGO substrates prepared from the above formulations in parts by weight have a whiteness of 81-90%, no cracking, a static bending strength of 30-35 MPa, a bending strength of 32-38 MPa, an impact strength of 22-26 kJ/m2 and a screw holding capacity in the range of 30-36 N/m. Besides, the slotting depths at which peeling and cracking occurred in the above-mentioned Examples 1 to 11 is 162-171 mm. Through comparison of the above Examples, Example 2 is the optimal substrate.

The components and formulations of high-whiteness MGO substrates prepared in comparative examples are shown in Table 4.

TABLE 4

Components and Formulations of High-whiteness MGO Substrates in Comparative Examples

| | Component/part | Comparative Example 1 | Comparative Example 2 | Comparative Example 3 |
|---|---|---|---|---|
| Forming agent | Light burned magnesium oxide | 45 kg | 45 kg | 45 kg |
| | Magnesium sulfate heptahydrate | 20.5 kg | 20.5 kg | 20.5 kg |
| | Polyvinyl alcohol solution | 20.5 kg | 20.5 kg | 20.5 kg |
| Lightweight filler (plant powder) | Poplar wood powder White wood powder Bamboo powder Straw powder Rice hull powder | 18 kg (poplar wood powder) | 18 kg (poplar wood powder) | 18 kg (poplar wood powder) |
| Modifier | Citric acid monohydrate Sodium sulfate Phosphoric acid | 0 kg | 1.25 kg (citric acid monohydrate: sodium sulfate: phosphoric acid = 8:3:7) | 1.25 kg (citric acid monohydrate: sodium sulfate: phosphoric acid = 12:2:5) |
| | Fineness of plant powder. | 70 mesh | 70 mesh | 70 mesh |
| Bleaching agent | Hydrogen peroxide bleaching agent 4,4'-diaminodiphenylamine-2-sulfonic acid | 50 kg (hydrogen peroxide bleaching agent: 4,4'-diaminodiphenylamine-2-sulfonic acid = 2:3) | 50 kg (hydrogen peroxide bleaching agent: 4,4'-diaminodiphenylamine-2-sulfonic acid = 2:3) | 50 kg (hydrogen peroxide bleaching agent: 4,4'-diaminodiphenylamine-2-sulfonic acid = 2:3) |
| | Time, temperature and humidity of curing | 6 days, 25° C., 55% | 6 days, 25° C., 55% | 6 days, 25° C., 55% |

Compared with Example 2, Comparative Example 1 was added with no modifier; Comparative Example 2 was added with a modifier prepared with a ratio, in parts by weight, of citric acid monohydrate:sodium sulfate:phosphoric acid=8:3:7; and Comparative Example 3 was added with a modifier prepared with a ratio, in parts by weight, of citric acid monohydrate:sodium sulfate:phosphoric acid=12:2:5.

Comparative Example 4

An MGO board purchased from Zhangjiagang Leader Import and Export Co., Ltd. was compared with the substrate manufactured according to the present application; and the components for preparing the purchased MGO board include active magnesium oxide, high-quality magnesium chloride, alkali-resistant glassfiber fabrics, plant fiber, incombustible lightweight perlite, chemically stable lithopone, high-molecular polymers and high-performance modifiers.

Comparative Example 5

An MGO board purchased from Zhangjiagang Shitai Building Materials Co., Ltd. was compared with the substrate manufactured according to the present application; and the components for preparing the purchased MGO board include active magnesium oxide, high-quality magnesium chloride, alkali-resistant glassfiber fabrics, excellent-flexibility plant fiber, incombustible lightweight perlite, high-molecular polymers and high-performance modifiers.

The high-whiteness MGO substrates obtained in the above Comparative Examples 1 to 3 were prepared with the same method as in the Examples, and Comparative Examples 4 and 5 were purchased from the market. Test results of the high-whiteness MGO substrates prepared in the above Comparative Examples 1 to 5 are shown in Table 5.

TABLE 5

Test Results of Properties of High-whiteness MGO Substrates Prepared in Comparative Examples

| Detection item | Whiteness | Apparent morphology | Static bending strength | Bending strength | Impact strength | Dehalogenation | Screw holding capacity | Slotting depth |
|---|---|---|---|---|---|---|---|---|
| JC688-2006 minimum standard value | | No cracking | 10 Mpa | 12 Mpa | 2.5 kJ/m$^2$ | No water drops, no damping | 20 N/m | No peeling, no cracking |
| Comparative Example 1 | 85% | No cracking | 25 Mpa | 30 Mpa | 15 kJ/m$^2$ | No water drops, no damping | 25 N/m | 85 mm |
| Comparative Example 2 | 85% | No cracking | 31 Mpa | 32 Mpa | 23 kJ/m$^2$ | No water drops, no damping | 28 N/m | 130 mm |
| Comparative Example 3 | 85% | No cracking | 32 Mpa | 33 Mpa | 24 kJ/m$^2$ | No water drops, no damping | 26 N/m | 141 mm |
| Comparative Example 4 | 65% | No cracking | 21 Mpa | 16 Mpa | 12 kJ/m$^2$ | No water drops, no damping | 21 N/m | 124 mm |
| Comparative Example 5 | 76% | No cracking | 23 Mpa | 22 Mpa | 14 kJ/m$^2$ | No water drops, no damping | 24 N/m | 126 mm |

As can be seen from the above data, when no modifier is added or a modifier with a mass ratio exceeding or below a certain mass ratio is added, fine bubbles may be unstably generated during preparation of magnesium oxysulfate cement, and may easily fuse with each other to form large pores, such that the phenomenon of peeling and cracking easily occurs after slotting. Compared with Comparative Examples 4 and 5, the substrate prepared in Example 2 has a strength much higher than commercially available magnesium oxide boards.

Examples of High-whiteness MGO decorative board

Example 8: A high-whiteness MGO decorative board included a surface layer and a substrate, and marble was used as the surface layer. The MGO substrate prepared according to Example 2 was bonded to a cut marble plane by using a polyurethane adhesive, and after 15 minutes of curing, the marble with the MGO substrate was cut off to obtain a marble surface combined with the MGO substrate, wherein the marble surface had a thickness of 0.5 mm, and the MGO substrate had a thickness of 4 mm; and the marble surface combined with the MGO substrate was taken out, and subjected to polishing and UV to obtain the high-whiteness MGO decorative board.

Example 9: A high-whiteness MGO decorative board included a surface layer and a substrate, and yellow poplar veneer was used as the surface layer. The MGO substrate prepared according to Example 2 was bonded to a veneer plane by using a polyurethane adhesive, and after 15 minutes of curing, a semi-product was obtained; and then the semi-product was subjected to sanding and UV or coloring and UV, cutting and slotting to obtain the high-whiteness MGO decorative board.

Example 10: A high-whiteness MGO decorative board included a surface layer and a substrate, and a PVC surface layer was used as the surface layer. The PVC surface layer included a face layer, a core layer and a bottom layer which were sequentially bonded by using a polyurethane adhesive; the face layer and the bottom layer were both PVC films; and the PVC surface layer was prepared as follows:

aluminium oxide abrasion paper was immersed in a mixed resin containing melamine resin and urea-formaldehyde resin in a mass ratio of 1:1 and soaked for 130 min, and then taken out to obtain an impregnated aluminium oxide abrasion paper;

a polyurethane adhesive was uniformly applied to two sides of the PVC films, and the PVC films were dried and cured to obtain adhesive-coated PVC films; and the adhesive-coated PVC films obtained in the step 2) were adhered to two sides of the impregnated aluminium oxide abrasion paper obtained in the step 1), and hot-press molding was performed under a temperature of 150° C. and a pressure of 20 MPa to obtain the PVC surface layer. Surface textures of the PVC surface layer were formed by compression with a steel form or a plastic high-temperature form.

A preparation method of the high-whiteness MGO decorative board includes the following steps that: the PVC surface layer prepared in this Example was bonded to the side surface of the substrate layer 2 prepared in Example 2 by using a polyurethane adhesive, and hot-pressing combination was performed with a hot press under a temperature of 150° C. and a pressure of 20 MPa, so that the high-whiteness MGO decorative board was obtained.

Example 11: A high-whiteness MGO decorative board included a surface layer and a substrate, and a PVC surface layer was used as the surface layer. The PVC surface layer included a face layer, a core layer and a bottom layer which were sequentially bonded by using a polyurethane adhesive; the face layer and the bottom layer were both PVC films; and the PVC surface layer was prepared as follows:

1) an alkali-free glassfiber surface mat was immersed in a mixed resin containing melamine resin and urea-formaldehyde resin in a mass ratio of 1:1 and soaked for 130 min, and then taken out to obtain an impregnated alkali-free glassfiber surface mat;

2) a polyurethane adhesive was uniformly applied to two sides of the PVC films, and the PVC films were dried and cured to obtain adhesive-coated PVC films; and 3) the adhesive-coated PVC films obtained in the step 2) were adhered to two sides of the alkali-free glassfiber surface mat obtained in the step 1), and hot-press molding was performed under a temperature of 150° C. and a pressure of 20 MPa to obtain the PVC surface layer. Surface textures of the PVC surface layer were formed by compression with a steel form or a plastic high-temperature form.

A preparation method of the high-whiteness MGO decorative board includes the following steps that: the PVC surface layer prepared in this Example was bonded to the side surface of the substrate layer 2 prepared in Example 2 by using a polyurethane adhesive, and hot-pressing combination was performed with a hot press under a temperature of 150° C. and a pressure of 20 MPa, so that the high-whiteness MGO decorative board was obtained.

Test results of the high-whiteness MGO decorative boards of Examples 8-11 are shown in Table 6 below.

TABLE 6

Test Results of High-whiteness MGO Decorative Boards

| Detection item | Apparent morphology | Static bending strength | Bending strength | Impact strength | Surface abrasion resistance | Screw holding capacity | Slotting depth | Incombustibility |
|---|---|---|---|---|---|---|---|---|
| Example 8 | No cracking | 35 Mpa | 38 Mpa | 26 kJ/m² | AC3 | 41 N/m | 172 mm | Grade A |
| Example 9 | No cracking | 37 Mpa | 40 Mpa | 33 kJ/m² | AC3 | 39 N/m | 181 mm | Grade A |
| Example 10 | No cracking | 42 Mpa | 56 Mpa | 42 kJ/m² | AC5 | 44 N/m | 189 mm | Grade A |
| Example 11 | No cracking | 41 Mpa | 57 Mpa | 42 kJ/m² | AC5 | 45 N/m | 188 mm | Grade A |

As can be seen from the above data, the strength of the high-whiteness MGO decorative board prepared by the preparation method is obviously increased; meanwhile, the decorative boards prepared in Examples 8 to 11 all have an abrasion resistance of up to higher than AC3 and an incombustibility of grade A.

The embodiments are merely illustrative of the application and are not intended to be limiting of the application, and modifications may be made to the embodiments by those skilled in the art, after reading the description, as required without involving any inventive contribution and are, however, to be protected by the patent law, provided they come within the scope of the appended claims.

What is claimed is:

1. A magnesium oxide substrate, comprising
a surface layer and a substrate,
wherein the substrate is prepared from the following components in parts by mass:
40-49 parts of light burned magnesium oxide powder,
18-25 parts of magnesium sulfate heptahydrate,
16-25 parts of a polyvinyl alcohol solution,
16-20 parts of a plant powder, and
0.5-2 parts of a modifier;
wherein the modifier comprises citric acid, phosphoric acid, and sodium sulfate in a mass ratio of 10:3:6.

2. The magnesium oxide substrate according to claim 1, wherein the light burned magnesium oxide has a content of magnesium oxide of ≥85% and a content of reactive magnesium oxide of >65%.

3. The magnesium oxide substrate according to claim 1, wherein the plant powder has a fineness of 20-120 mesh, and comprise one or more selected from the group consisting of poplar wood powder, white wood powder, bamboo powder, straw powder, and rice hull powder.

4. A preparation method of the magnesium oxide substrate according to claim 1, comprising the following steps of:
S1, weighing light burned magnesium oxide powder, magnesium sulfate heptahydrate, a polyvinyl alcohol solution with a mass concentration of 20%-40%, a plant powder, and a modifier;
S2, mixing the plant powder with a bleaching agent in an amount sufficient for immersing the plant powder, soaking the plant powder for 2-10 min, stirring the obtained mixture for 30-40 min, and filtering; and subjecting the plant powder obtained by filtering to constant-temperature steam treatment for 5-8 min under a temperature of 120-130° C. to obtain a bleached plant powder;
S3, uniformly mixing and stirring the magnesium sulfate heptahydrate and the polyvinyl alcohol solution with the mass concentration of 20%-40% which are weighed in the step S1, sequentially adding the light burned magnesium oxide and the modifier, and performing stirring, then adding the bleached plant powder prepared in the step S2, and uniformly stirring the obtained mixture to obtain a magnesium oxysulfate cement;
S4, spreading the magnesium oxysulfate cement prepared in the step S3 into a mold, performing flat-pressing for 3-10 min under a temperature of 100-220° C. and a pressure of 5-20 MPa, leaving the mold with the magnesium oxysulfate cement to stand for 5-6 h, and removing the mold to obtain a molded semi-finished product; and
S5, curing the molded semi-finished product obtained in the step S4 for 5-7 days under a temperature of 20-30° C. and a humidity of 40-60% to obtain a semi-finished substrate; taking out the semi-finished substrate for trimming, cutting and polishing; and then drying the polished semi-finished substrate under a temperature of 50-95° C. for 20-30 min to obtain a shaped substrate.

5. The preparation method of the magnesium oxide substrate according to claim 4, wherein the bleaching agent comprises a hydrogen peroxide bleaching agent and a diaminostilbene disulfonic acid derivative in a mass ratio of 2:3.

6. A magnesium oxide decorative board, comprising a surface layer and a substrate,
wherein the substrate adopts the magnesium oxide substrate according to claim 1, and the surface layer is any one selected from the group consisting of marble, wood veneer, and a PVC surface layer.

7. The magnesium oxide decorative board according to claim 6, wherein the PVC surface layer comprises a face layer, a core layer, and a bottom layer which are sequentially bonded through an adhesive; and the face layer and the bottom layer are both PVC films; and the PVC surface layer is prepared as follows:
1) immersing the core layer in resin for 120-150 min, and taking out the core layer to obtain an impregnated core layer;
2) uniformly applying the adhesive to two sides of the PVC films, and drying and curing the PVC films to obtain adhesive-coated PVC films; and
3) adhering the adhesive-coated PVC films obtained in the step 2) to two sides of the impregnated core layer obtained in the step 1), and performing hot-press molding under a temperature of 130-170° C. and a pressure of 10-21 MPa to obtain the PVC surface layer.

8. The magnesium oxide decorative board according to claim 7, wherein the core layer is an aluminum oxide abrasion paper or a glassfiber surface mat.

9. The magnesium oxide decorative board according to claim 8, wherein the resin includes one or both of melamine resin and urea-formaldehyde resin.

\* \* \* \* \*